United States Patent
Razak

(10) Patent No.: US 8,289,651 B2
(45) Date of Patent: Oct. 16, 2012

(54) APPARATUS TO CONTROL HEAT DISSIPATION IN HARD-DISK DRIVES

(75) Inventor: Ramlah Binte Abdul Razak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1029 days.

(21) Appl. No.: 12/102,496

(22) Filed: Apr. 14, 2008

(65) Prior Publication Data

US 2009/0128948 A1    May 21, 2009

Related U.S. Application Data

(60) Provisional application No. 60/988,541, filed on Nov. 16, 2007.

(51) Int. Cl.
*G11B 5/60*    (2006.01)

(52) U.S. Cl. ............... 360/234.5; 360/97.12; 360/234.6; 360/245.8; 360/245.9

(58) Field of Classification Search .... 360/234.4–234.6, 360/234.7–235, 244.1, 245.8–246, 97.12
See application file for complete search history.

(56) References Cited

U.S. PATENT DOCUMENTS

| | | | | |
|---|---|---|---|---|
| 6,898,840 | B1 * | 5/2005 | Shiraishi et al. | 29/603.04 |
| 7,154,708 | B2 * | 12/2006 | Chhabra et al. | 360/234.5 |
| 7,239,488 | B2 * | 7/2007 | Zhu et al. | 360/323 |

* cited by examiner

*Primary Examiner* — Allen Heinz
(74) *Attorney, Agent, or Firm* — John J. Patti; Wade J. Brady, III; Frederick J. Telecky, Jr.

(57) ABSTRACT

Methods and apparatus to control heat dissipation in hard-disk drives (HDDs) are disclosed. A disclosed example apparatus comprises a semiconductor die, a ground bump positioned on the die, and a hard-disk drive writer head positioned on the die relative to the ground bump based on a thermal impedance.

8 Claims, 6 Drawing Sheets

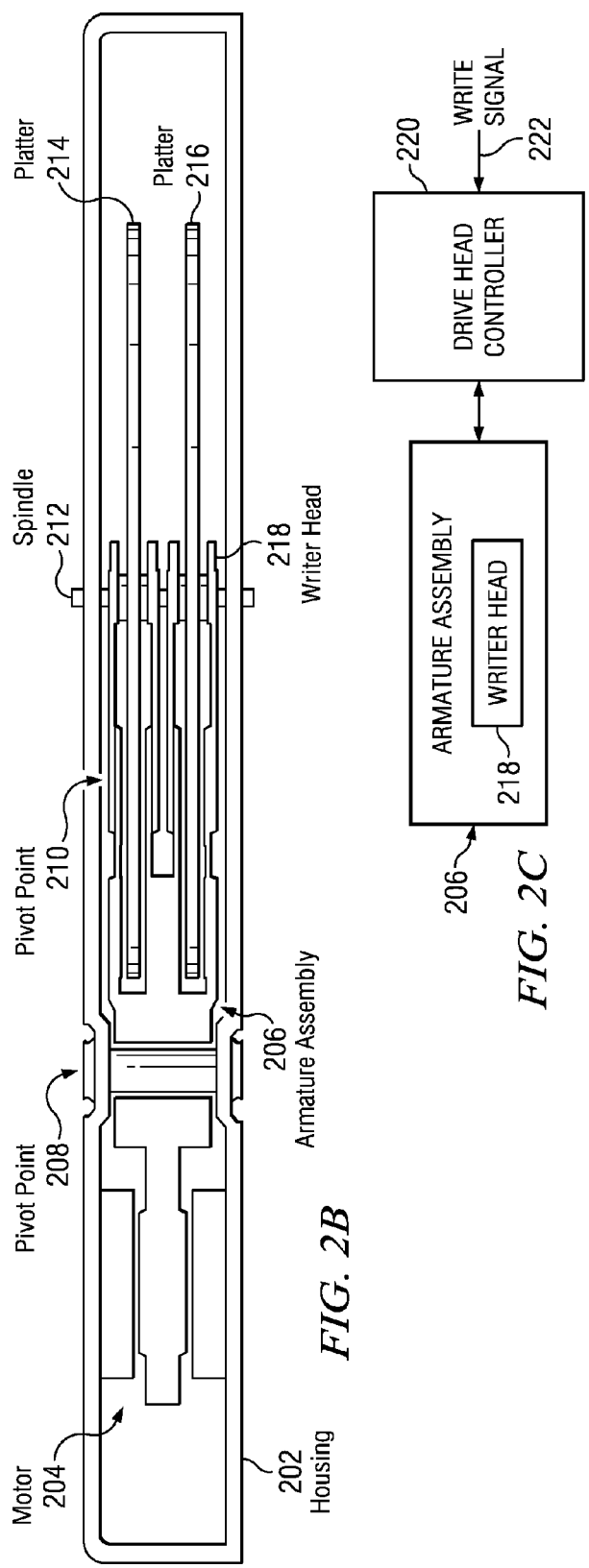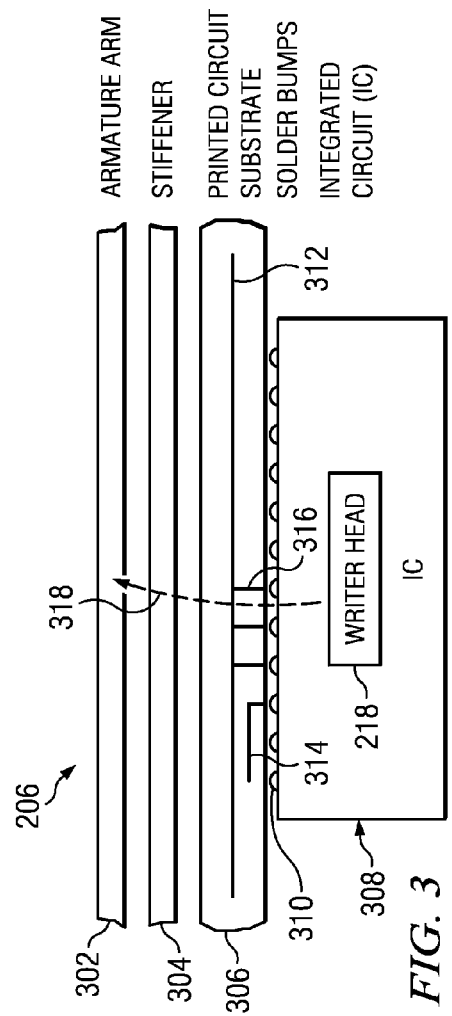

APPARATUS TO CONTROL HEAT DISSIPATION IN HARD-DISK DRIVES

RELATED APPLICATIONS

This patent claims the benefit of U.S. Provisional Application Ser. No. 60/988,541, entitled "Footprint of Preamp Writer Heads," filed on Nov. 16, 2007, and which is hereby incorporated by reference in its entirety.

FIELD OF THE DISCLOSURE

This disclosure relates generally to hard-disk drives (HDDs), and, more particularly, to methods and apparatus to control heat dissipation in HDDs.

BACKGROUND

HDDs use one or more disks and/or platters that rotate about a spindle with respect to one or more heads, such as read and/or writer heads. The read or writer heads read information from and/or impart information to the disk platters, but do not, in desired operation, physically contact the platters. Traditionally, a HDD head is implemented by an integrated circuit (IC) that is subsequently mounted (e.g., soldered) to a printed circuit substrate (e.g., a printed circuit board (PCB) and/or a printed circuit cable assembly (PCCA). The printed circuit substrate is affixed to a stiffener and/or armature arm that positions the HDD head relative to a disk platter.

FIG. 1 is a plan view of an example of a layout 100 for armature assembly printed circuit substrate 102 for an HDD. In the illustrated example of FIG. 1, seats (e.g., 106-1) and solder bumps or balls (e.g., 108-1) on a printed circuit substrate 102 are shown. In particular, there is an IC seat 104 (which is the position or location for the IC) having sides A, B, C, and D for an IC that implements four HDD writer heads is shown in a broken line. Each of the HDD write heads within the IC includes seats 106-1 to 106-4 (which are illustrated with broken lines). As shown, the HDD writer head seats 106-1 to 106-4 are positioned at the edge of side A of the IC seat 104 to, for example, shorten a trace length from solder bumps (e.g., sets of solder balls 108-1 to 108-4) for the writer head seats 106-1 to 106-4 to other components, circuits and/or devices of the printed circuit substrate 102. There are also several other sets of solder balls or bumps 110 to 116 associate with seat 104.

BRIEF DESCRIPTION OF THE DRAWINGS

FIGS. 2A to 2C are diagrams of an example HDD constructed in accordance with the teachings of the invention;

FIG. 3 is a side-view showing additional detail of an example manner of implementing the example armature assembly of FIG. 2;

DETAILED DESCRIPTION

Figure 2A:
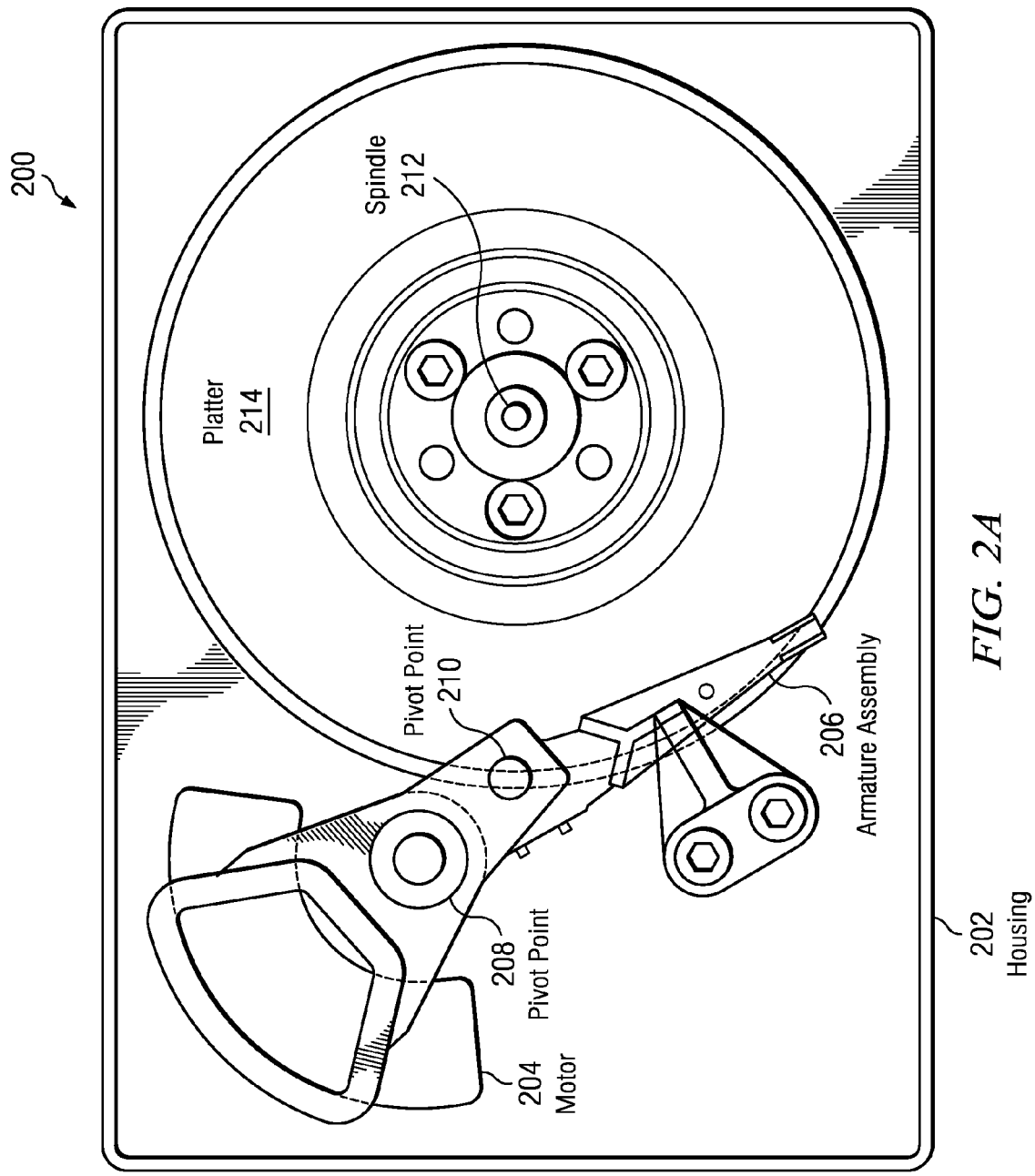

As shown in FIGS. 2A to 2C, an HDD system 200 of a computer in accordance with the teachings of the invention can be seen. As shown, the HDD system 200 generally comprises a motor 204 that controls the movement of an armature assembly 206, pivoting about pivot points 208 and 210. This arrangement allows the writer heads 218 to sweep across platters 214 and 216 (which rotates about spindle 212) so as to read and write data to the platters 214 and 216. All of these items are contained within a housing 202. HDD system 200 may also include one or more platters (e.g., platters 214 and 216). There may also be one or more armature assemblies (one of which is designated at reference numeral 206). The example armature assembly 206 of FIGS. 2A and 2B includes one or more HDD read and/or writer heads (one example writer head is designated at reference numeral 218) for reading information from and/or writing information to the platters 214 and 216. In the write context, the example HDD writer head 218 is coupled to a drive head controller 220, which processes a write signal 222 and provides one or more signals to the writer head 218 and/or, more generally, the armature assembly 206 to cause data associated with the write signal 222 to be written to one or more of the platters 214 and 216.

FIG. 3 illustrates a side-view showing additional details of an example manner of implementing the example armature arm assembly 206 of FIGS. 2A to 2C. The example armature assembly 206 of FIG. 3 includes an armature arm 302, a stiffener 304, a printed circuit substrate 306 (e.g., a printed circuit board (PCB) and/or PCCA) having one or more copper and/or ground planes 312, and an IC 308. As shown, the IC 308 includes the example HDD writer head 218. The example HDD writer head 218 of FIG. 3 is positioned within the IC 308 to control the manner in which heat is conducted from the HDD writer head 218 to other portions of the armature assembly 206 (e.g., along path 318). That is, how well the heat is being conducted from the HDD writer head 218 to one or more of the copper and/or ground plane 312 of the substrate 306, the stiffener 304 and/or the armature arm 302. In some examples, the HDD writer head 218 is positioned within the IC 308 to minimize a thermal impedance from the HDD writer head 218 to the armature arm 302. However, the HDD writer head 218 may be positioned within the IC 308 to decrease the thermal impedance subject to other design constraints, such as clock speed, signal skew, noise, and so forth.

As described above, to implement the example HDD writer head 218, the example armature assembly 206 of FIG. 3 includes the example IC 308. The example IC 308 may be, for example, a semiconductor die onto which circuits (e.g., the example HDD writer head 218), components, devices, traces, etc. are depositing using any number and/or type(s) of silicon manufacturing processes. The example IC 308 is constructed as a so-called "flip-chip", which is also referred to in the industry as a controlled collapse chip connection (C4) type of mounting. However, any type of package and/or mounting may be used to construct the IC 308. For example, the IC 308 may include one or more semiconductor dice, one or more bonding wires and a semiconductor package. Compared to some other types of chip packages, the example IC 308 of FIG. 3 has a plurality of solder bumps (one of which is designated at reference numeral 310) instead of wire bonds.

The example solder bumps or balls 310 of FIG. 3 may be, for example, constructed by depositing solder onto chip pads of the IC 308, which are located on the top side of the IC 308, during a final wafer processing step. The example IC 308 is mounted to the printed circuit substrate 306 by "flipping" the chip such that the top of the IC 308 is facing down towards a mounting area of the example printed circuit substrate 306. The solder bumps 310 are then re-melted (e.g., using ultrasound) to adhere the IC 308 to the printed circuit substrate 306. Once the IC 308 is affixed to the printed circuit substrate 306, circuits (e.g., the example HDD writer head 218), nodes, devices and/or traces of the IC 308 become electrically coupled to circuits, nodes, traces (two of which are designated at reference numerals 314 and 316), and/or copper and/or ground planes (one of which is designated at reference numeral 312) of the example printed circuit substrate 306. In some examples, the mounted IC 308 is then under filled using an electrically-insulating adhesive (not shown).

Typically, there is a subset of solder bumps 310 of the IC 308 are dedicated to and/or used to provide coupling of ground signals and/or ground traces of the example IC 308 to a ground plane (e.g., the example plane 312) of the example printed circuit substrate 306. These solder bumps can be referred to as "ground bumps," to delineate their purpose from other solder bumps (e.g., the solder bump 310) used to electrically couple other types of signals. As described more fully below in connection with FIG. 4, the example HDD writer head 218 of FIG. 3 is positioned within and/or located on the IC 308 to control how well heat can be conducted from the HDD writer head 218 to the ground plane 312 and, thus, to other portions of the example armature assembly 206. Subject to any other design and/or layout constraints (e.g., clock speed, signal skew, noise, etc.), the example writer head 218 of FIG. 3 is located relative to (e.g., as close as possible to) one or more ground bumps 311 to increase (e.g., maximize) the amount of heat (generated by operation of the writer head 218) that is conducted by the nearby ground bumps to the ground plane 312 (e.g., through trace 316). That is, the example writer head 218 is purposefully located on the IC 308 to lower the thermal impedance of the silicon junctions that comprise the writer head 218. Such a lowering of the thermal impedance allows, for example, that the writer head 218 may be operated at higher clock frequencies and/or facilitates better thermal stability of the printed circuit substrate 306 and/or, more generally, the entire armature assembly 206. In contrast, traditional HDD ICs have their writer heads placed within the IC without regard to thermal constraints. For example, placing them at the edges of an IC for ease of routing within the IC and/or a printed circuit substrate to which the IC is mounted, as describe above in connection with FIG. 1.

To increase the rigidity of the example printed circuit substrate 306, the example armature assembly 206 of FIG. 3 includes a stiffener 304. In modern HDDs, sufficient rigidity of the printed circuit substrate 306 is important, while the HDD is operating, to controlling and/or maintaining a separation between the example writer head 218 and a platter (e.g., the example platter 216 of FIG. 2B). The example stiffener 304 of FIG. 3 includes one or more mounts (e.g., holes and associated screws that allow the example printed circuit substrate 306 to be mechanically attached to the stiffener 304. In addition to increasing the rigidity of the printed circuit substrate 306, the example stiffener 304 also serves as part of a thermal conductivity path 318 between the writer head 218 and an armature arm 302.

The example armature arm 302 of FIG. 3 is controlled by, for example, the drive head controller 220 of FIG. 2C, to position the writer head 218 relative to a HDD platter, such as the example platter 216. The example armature arm 302 also serves as a thermal sink for heat generated by the writer head 218 and conducted to the armature arm 302 via the thermal conduction path 318.

Figure 4:
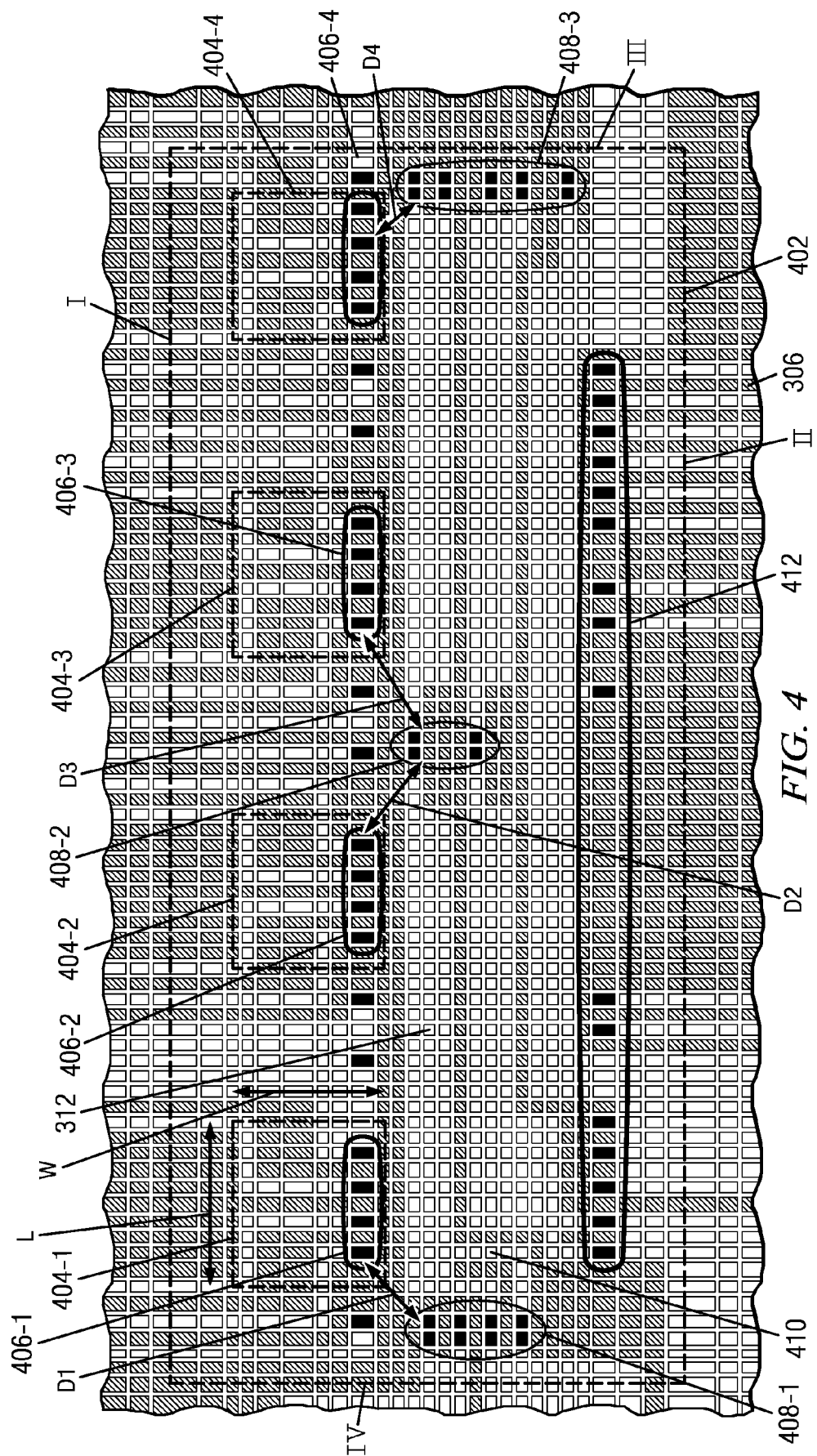
FIG. 4 is a top view of an example layout for the armature assembly of FIG. 3.

Turning to FIG. 4, an example layout for IC 308 of the armature assembly 206 of can be seen. As shown in this example, four writer heads (e.g., head 218) are positioned within the IC 308 so that the writer heads (e.g., 218) are close to one or more sets of ground bumps 408-1, 408-2, and 408-3 (which can be collectively referred to as a set of ground bumps 408). By locating the writer heads (e.g., 218) near to the ground bumps 408-1, 408-2, and/or 408-3, heat can be readily conducted from the writer heads to the ground bumps 408-1, 408-2, and/or 408-3, and from the ground bumps 408-1, 408-2, and/or 408-3 via one or more traces (one of which is designated at reference numeral 410) of the printed circuit substrate 306 to a ground plane 312 of the printed circuit substrate 306. As shown in this example, IC 308 has a seat or positioning location 402 (having sides I, II, III, and IV) with seats or positioning locations 404-1 to 404-4 for the four write heads (which each have a width W and a length L). Each of these seats 404-1 to 404-4 includes a set of bumps 406-1 to 406-2 (where, collectively, sets 406-1 to 406-4 can be referred to as set 406). An example thermal design constraint and/or rule lays out, designs, locates, positions and/or orients the writer heads seats 404-1 to 404-4 within seat 402 such that a distance (e.g., distances D1, D2, D2, or D4) from any significant heat generating solder bump (such as set of bumps 406-1) to a set of ground bumps (e.g., 408-1) is no greater than a dimension (e.g., length L or width W) of the seat (e.g., 404-1). Seat 402, as shown, also includes a set of bumps 412 (which are coupled to ground plane 312) located in proximity to side or edge II.

While an example manner of implementing the example armature apparatus 206 of FIG. 2 is illustrated in FIGS. 3 and 4, an armature apparatus may be implemented using any number and/or type(s) of alternative and/or additional logic, devices, components, circuits, modules, interfaces, etc. Further, the logic, devices, components, circuits, modules, elements, interfaces, etc. illustrated in FIGS. 3 and/or 4 may be combined, divided, re-arranged, omitted, eliminated and/or implemented in any other way. For example the example stiffener 304 and the example armature arm 302 could be combined into a single module, and/or a different number of writer heads (e.g., eight) could be implemented by an IC and/or an armature assembly. Moreover, an armature assembly may include additional logic, devices, components, circuits, interfaces and/or modules instead of, or in addition to those illustrated in FIGS. 3 and/or 4.

Figure 1:
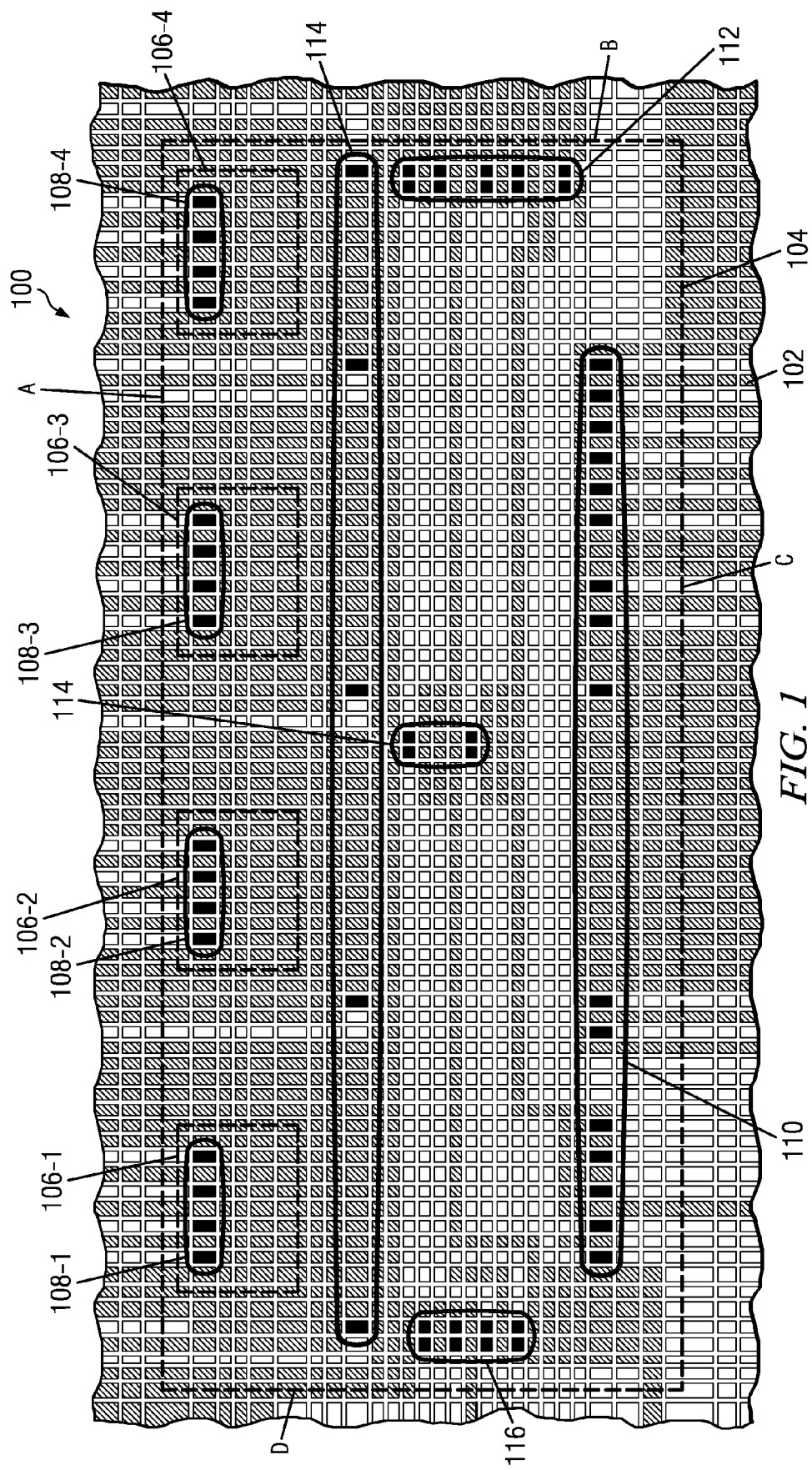
FIG. 1 is a top view of an example prior art layout for an armature assembly for an HDD.
Figure 5:
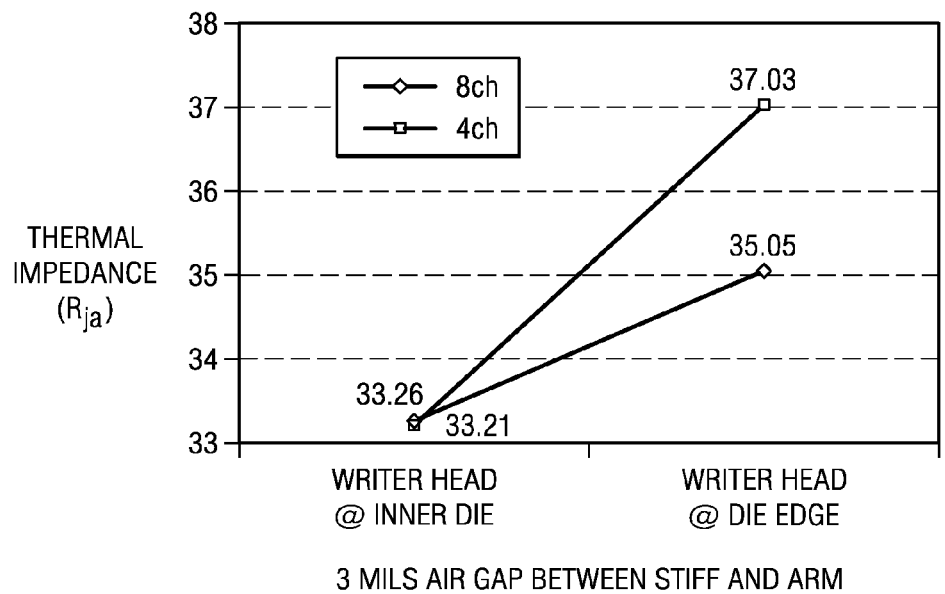
FIG. 5 is a graph illustrating example thermal impedance improvements that may be achieved by positioning a HDD writer head based on thermal conductivity principles described herein.

FIG. 5 is a graph illustrating example thermal impedance improvements that may be achieved by positioning HDD writer heads as described herein. Thermal impedance values are shown for combinations of the number of writer heads per the example IC 308 (four and eight), and whether the writer heads (e.g., 218) are placed near the edge of the IC 308 (as illustrated in FIG. 1) or within an interior portion of the IC 308 near to ground bumps (e.g., the example ground bumps 408-1 to 408-4). As illustrated in FIG. 5, a five to ten percent decrease in thermal impedance can be achieved by positioning HDD writer heads (e.g., 218) based on thermal conductivity principles.

Figure 6:
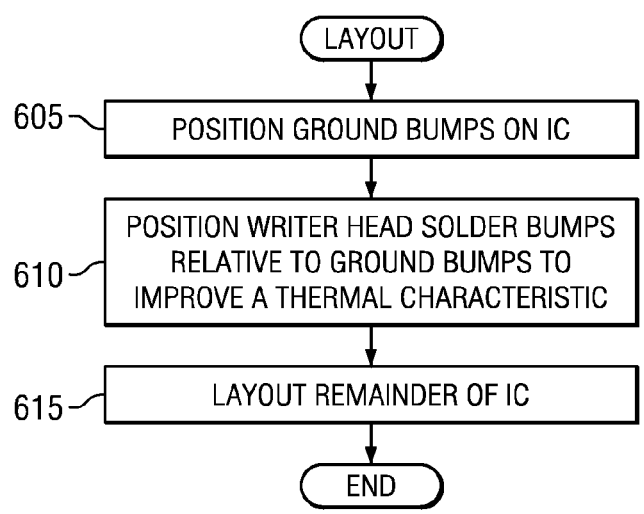
FIG. 6 is a flowchart of an example process that may be carried out to position a HDD writer head on an IC.

FIG. 6 is a flowchart representative of example process that may be carried out to locate and/or place HDD writer heads on an IC. The example process of FIG. 6 may be carried out by a processor, a controller and/or any other suitable processing device. For example, the example process of FIG. 6 may be embodied in coded instructions stored on a tangible medium such as a flash memory, a read-only memory (ROM) and/or random-access memory (RAM) associated with a processor (e.g., the example processor P105 discussed below in connection with FIG. 7). Alternatively, some or all of the example process of FIG. 6 may be implemented using any combination(s) of circuit(s), application specific integrated circuit(s) (ASIC(s)), programmable logic device(s) (PLD(s)), field programmable logic device(s) (FPLD(s)), discrete logic, hardware, firmware, etc. Also, some or all of the example process of FIG. 6 may be implemented manually or as any combination of any of the foregoing techniques, for example, any combination of firmware, software, discrete logic and/or hardware. Moreover, the example process of FIG. 6 may be incorporated in design rules enforced by an IC design and/or layout tool and/or software. Further, although the example operations of FIG. 6 are described with reference to the flowchart of FIG. 6, many other methods of implementing the operations of FIG. 6 may be employed. For example, the order of execution of the blocks may be changed, and/or one or more of the blocks described may be changed, eliminated, sub-divided, or combined. Additionally, any or all of the example process of FIG. 6 may be carried out sequentially and/or carried out in parallel by, for example, separate processing threads, processors, devices, discrete logic, circuits, etc.

The example process of FIG. 6 begins by positioning grounds bumps 405 on a IC 308 of an IC 308 (block 605). Writer heads (e.g., 218) are then positioned on the IC 308 relative to the ground bumps (e.g., 408-1) to improve a thermal characteristic of the IC 308 (e.g., reduce a thermal impedance) (block 610). The remainder of components, circuits, devices and/or traces of the IC 308 are then placed and/or laid out on the IC 308 (block 615). Control then exits from the example process of FIG. 6.

Additionally or alternatively, the example process of FIG. 6 may be applied iteratively wherein one or more layout constraints are verified upon completion of block 615. If one or more of the constraints are not met, the process could be repeated after one or more design rules are relaxed (e.g., a maximum distance between a writer head 218, 420-422 and ground bumps 405 is increased). Moreover, a portion of the IC 308 may be laid out prior to the ground bumps 405 and/or writer heads 218, 420-422 being placed.

Figure 7:
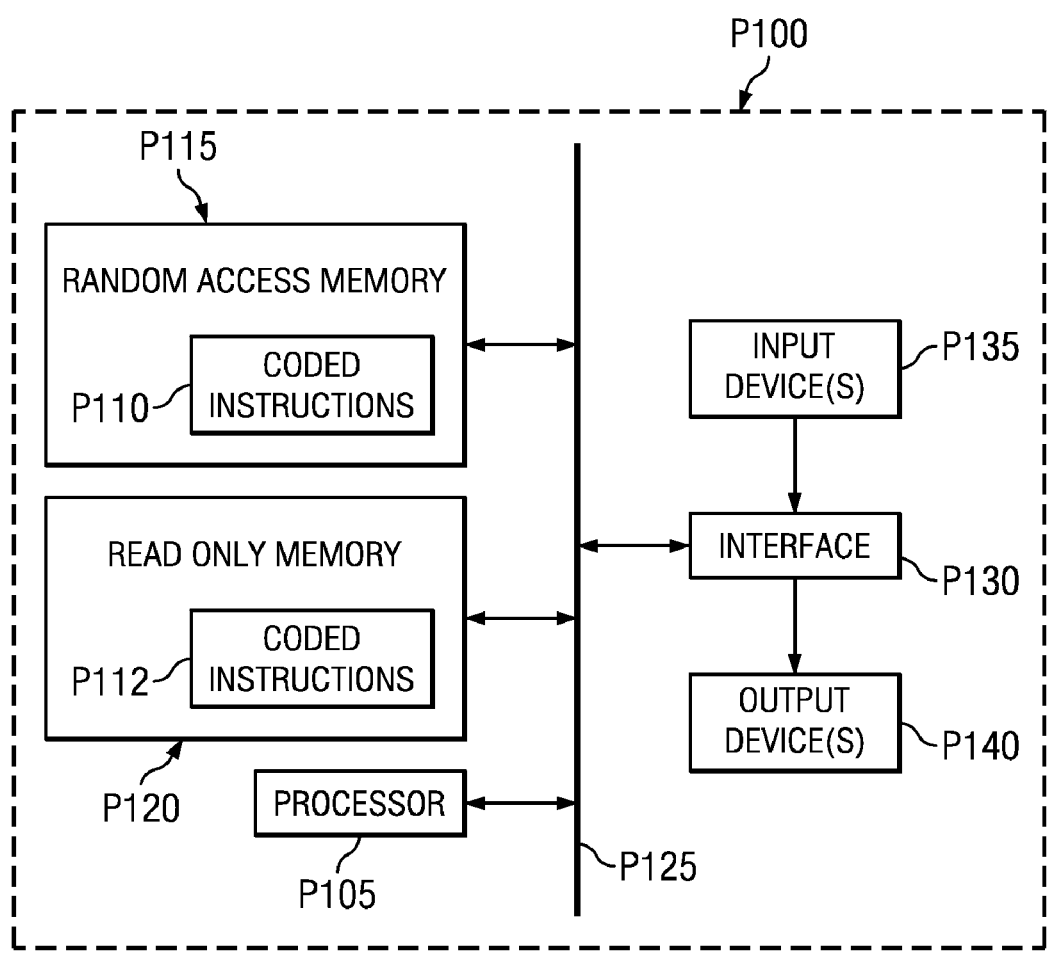
FIG. 7 is a schematic illustration of an example processor platform that may be used and/or programmed to execute the example process of FIG. 6 to place a HDD writer head on an IC as described herein.

FIG. 7 is a schematic diagram of an example processor platform P100 that may be used and/or programmed to layout a HDD IC in accordance with the writer head placement methods and apparatus described herein. The example process platform P100 may, additionally or alternatively, be used and/or programmed to implement an IC design and/or layout tool that includes the writer head placement methods and apparatus described herein. The example processor platform P100 can be implemented by one or more general purpose processors, processor cores, microcontrollers, etc.

The processor platform P100 of the example of FIG. 7 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 6 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
    an armature arm having a first and an opposite second side;
    a printed circuit board (PCB) having a first and an opposite second side, wherein the first side of the PCB is secured to at least a portion of the first side of the armature arm, wherein the PCB includes:
        an integrated circuit (IC) seat that includes a plurality of writer head seats, wherein the IC seat is located on the second side of the PCB, wherein the IC seat is substantially rectangular having a first side, a second side, a third side and a fourth side, and wherein the first and second sides are substantially parallel to one another, and wherein the third and fourth sides are substantially parallel to one another, and wherein each writer head seat has a first dimension and a second dimension;
        a ground plane that underlies at least a portion of the IC seat; and
        a plurality of circuit traces, wherein at least one trace is in electrical contact with the ground plane;
    an IC that is substantially aligned with the IC seat, wherein the IC seat includes a plurality of writer heads, wherein each writer head is substantially aligned with at least one of the writer head seats;
    a first set of solder bumps that are secured to the IC and the PCB such that the IC is in electrical contact with the wound plane, wherein a first subset of solder bumps from the first set of solder bumps located along the first side of the IC seat, and wherein a second subset of solder bumps from the first set of solder bumps is located along the second side of the IC seat; and
    a plurality of second sets of solder bumps, wherein each solder bump from each of the second sets of solder bumps is secured to the IC and the PCB, wherein each second set of solder bumps is associated with at least one of the writer head seats, and wherein each solder bump from each of the second sets of solder bumps is positioned to be less than the first dimension of each write head seat from at least one of the solder bumps from the first set of solder bumps.

2. The apparatus of claim 1, wherein the apparatus further comprises a stiffener that is secured between the PCB and the armature arm.

3. The apparatus of claim 2, wherein the plurality of writer head seats further comprises four writer head seats, and wherein the plurality of writer heads further comprises four writer heads.

4. The apparatus of claim 3, wherein each second set of solder humps further comprise four solder bumps.

5. An apparatus comprising:
a housing;
a platter;
a spindle that is secured to the platter and the housing;
an armature arm assembly having:
  an armature arm that is secured to the housing and that pivots about an axis above the platter, wherein the armature arm has a first and an opposite second side;
  a PCB having a first and an opposite second side, wherein the first side of the PCB is secured to at least a portion of the first side of the armature arm, wherein the PCB includes:
    an IC seat that includes a plurality of writer head seats, wherein the IC seat is located on the second side of the PCB, wherein the IC seat is substantially rectangular having a first side, a second side, a third side and a fourth side, and wherein the first and second sides are substantially parallel to one another, and wherein the third and fourth sides are substantially parallel to one another, and wherein each writer head seat has a first dimension and a second dimension;
    a ground plane that underlies at least a portion of the IC seat; and
    a plurality of circuit traces, wherein at least one trace is in electrical contact with the ground plane;
  an IC that is substantially aligned with the IC seat, wherein the IC seat includes a plurality of writer heads, wherein each writer head seat is substantially aligned with at least one of the writer head seats;
  a first set of solder bumps that are secured to the IC and the PCB such that the IC is in electrical contact with the ground plane, wherein a first subset of solder bumps from the first set of solder bumps located along the first side of the IC seat, and wherein a second subset of solder bumps from the first set of solder bumps is located along the second side of the IC seat; and
  a plurality of second sets of solder bumps, wherein each solder bump from each of the second sets of solder bumps is secured to the IC and the PCB, wherein each second set of solder bumps is associated with at least one of the writer head seats, and wherein each solder bump from each of the second sets of solder bumps is positioned to be less than the first dimension of each write head seat from at least one of the solder bumps from the first set of solder bumps; and
drive head controller that is electrically coupled to the IC through the armature arm assembly.

6. The apparatus of claim 5, wherein the apparatus further comprises a stiffener that is secured between the PCB and the armature arm.

7. The apparatus of claim 6, wherein the plurality of writer head seats further comprises four writer head seats, and wherein the plurality of writer heads further comprises four writer heads.

8. The apparatus of claim 7, wherein each second set of solder humps further comprise four solder bumps.

* * * * *